United States Patent
Baudu et al.

[19]

[11] Patent Number: 6,019,397
[45] Date of Patent: Feb. 1, 2000

[54] HYDRAULIC FITTINGS FOR A HYDRAULIC UNIT WITH A SECURITY CONNECTION SYSTEM

[75] Inventors: Pierre Baudu, Le Havre; Patrick Gonidec, Sainte Adresse; Guy Bernard Vauchel, Le Havre, all of France

[73] Assignee: Societe Hispano-Suiza Aerostructures, L'Orcher, France

[21] Appl. No.: 09/098,564

[22] Filed: Jun. 17, 1998

[30] Foreign Application Priority Data

Jun. 19, 1997 [FR] France ................................. 97 07619

[51] Int. Cl.[7] ..................................... F16L 39/00
[52] U.S. Cl. ..................... 285/124.1; 285/28; 285/124.3
[58] Field of Search .................. 285/1, 25, 26, 285/28, 29, 30, 124.1, 124.2, 124.3, 124.5, 124.4, FOR 118

[56] References Cited

U.S. PATENT DOCUMENTS

| | | | |
|---|---|---|---|
| 3,869,153 | 3/1975 | De Vincent et al. | 285/124.3 |
| 4,116,476 | 9/1978 | Porter et al. | 285/124.4 |
| 4,753,268 | 6/1988 | Palau | 285/124.1 |
| 5,201,552 | 4/1993 | Hohmann et al. | 285/124.4 |
| 5,323,808 | 6/1994 | Shimizu | 285/124.5 |
| 5,354,101 | 10/1994 | Anderson, Jr. | 285/124.5 |
| 5,415,437 | 5/1995 | Asou et al. | 285/124.4 |
| 5,507,529 | 4/1996 | Martins | 285/124.2 |
| 5,556,137 | 9/1996 | Ream . | |
| 5,556,138 | 9/1996 | Nakajima et al. | 285/124.4 |

FOREIGN PATENT DOCUMENTS

| | | |
|---|---|---|
| 0 494 818 | 7/1992 | European Pat. Off. . |
| 2727493 | 5/1996 | France . |
| 2 740 852 | 5/1997 | France . |
| 44 32 562 | 4/1995 | Germany . |

*Primary Examiner*—Eric K. Nicholson
*Attorney, Agent, or Firm*—Bacon & Thomas, PLLC

[57] ABSTRACT

A security hydraulic coupling system includes at least two hydraulic connector fittings (4, 5) which may be connected to adjacent fluid ports (1, 2) of a hydraulic unit (12) and which are linked to each other by means of a base plate (3) which is also shaped to cooperate with at least one projection (10) on the hydraulic unit (12) to thereby physically prescribe the positions of the various elements during the steps of fitting connection and disconnection. An interlock system comprises a security pin (6) which is housed in the base plate (3) and is mounted between the fittings (4, 5) and cooperates with grooves (7, 8) provided in the fittings (4, 5) to prescribe the possible sequence of steps in connecting/disconnecting the fittings (4, 5) from the ports of the hydraulic unit (12).

7 Claims, 4 Drawing Sheets

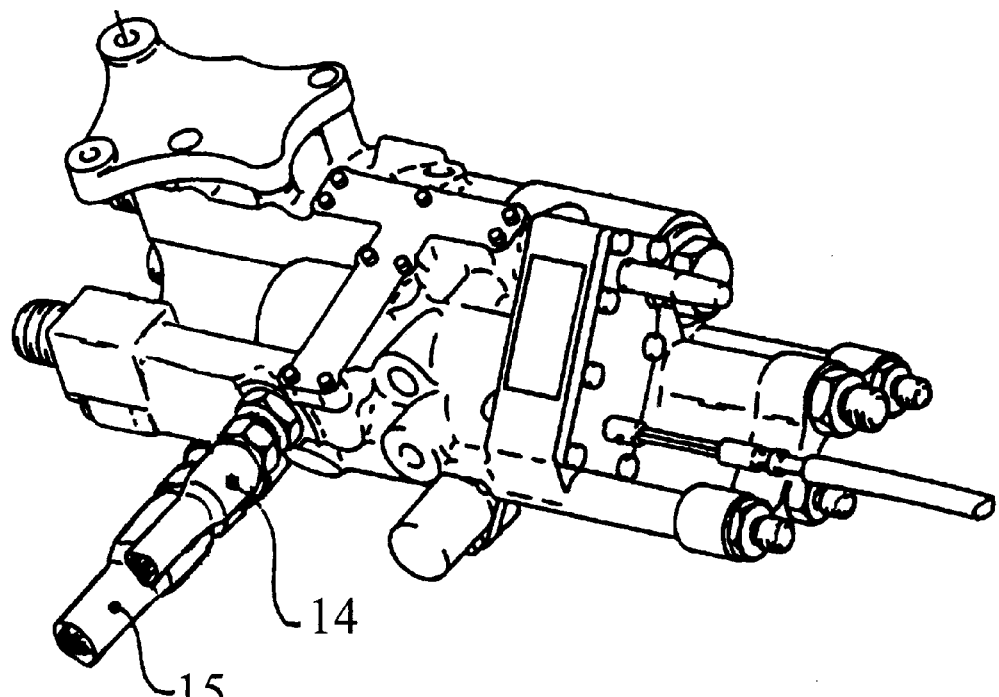
Fig : 1
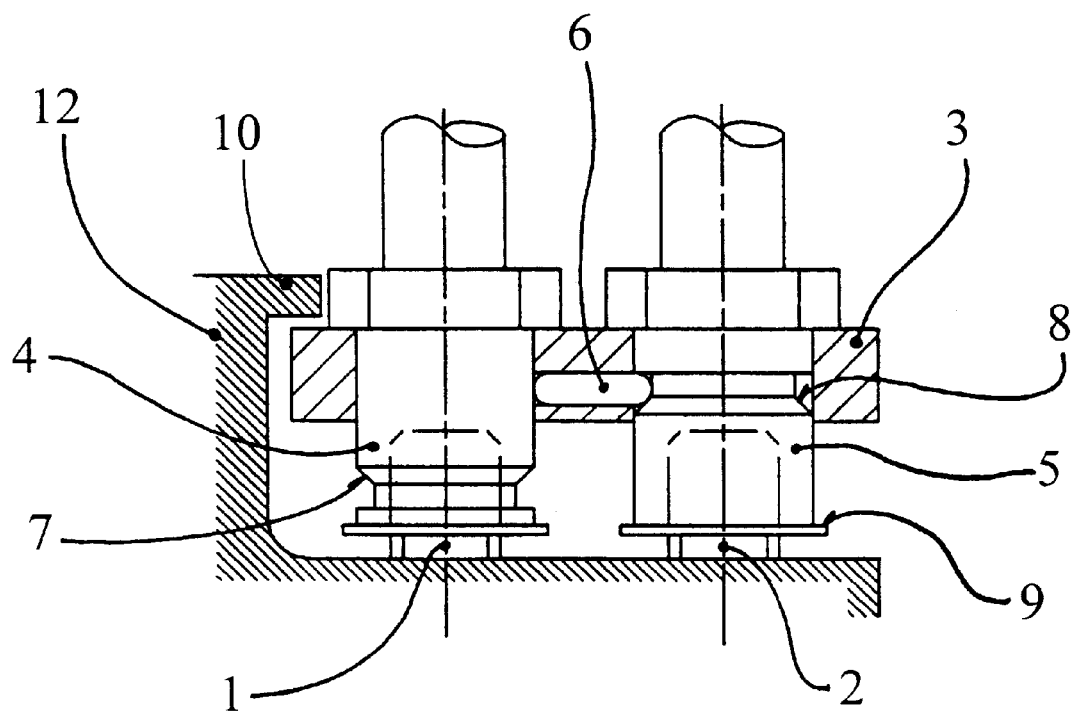
Fig : 2

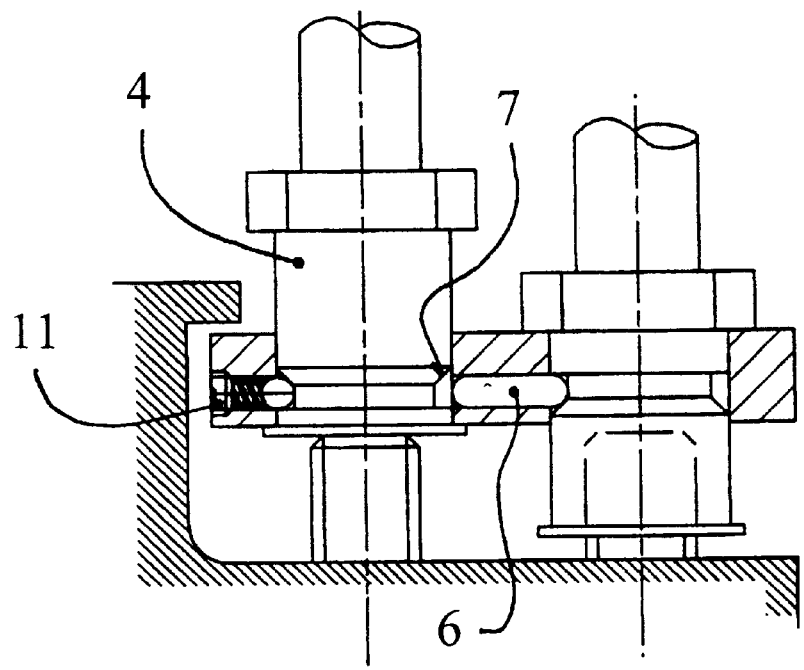
Fig : 3
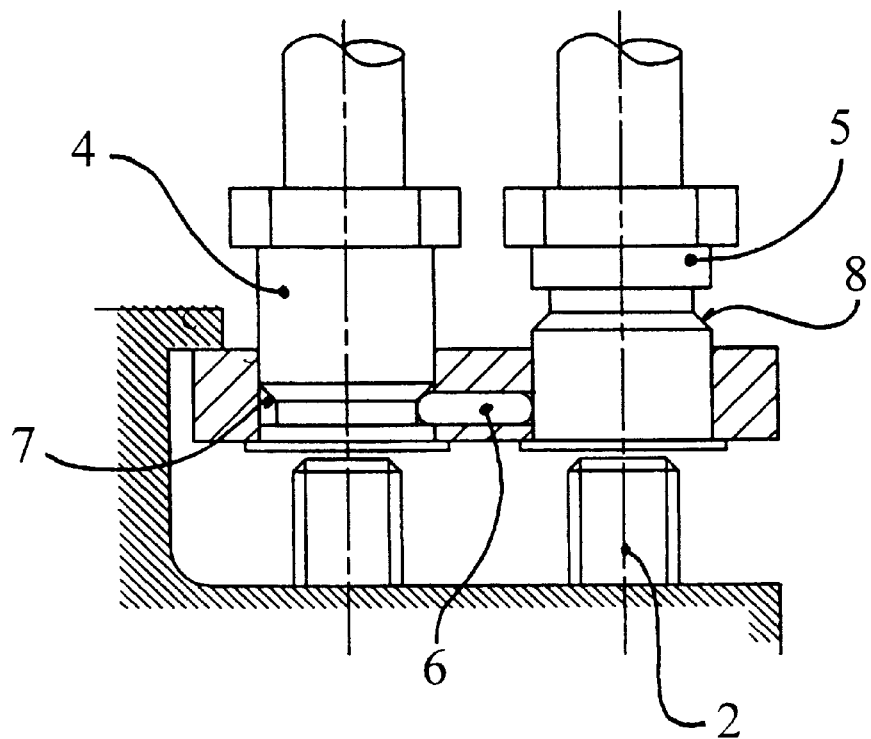
Fig : 4

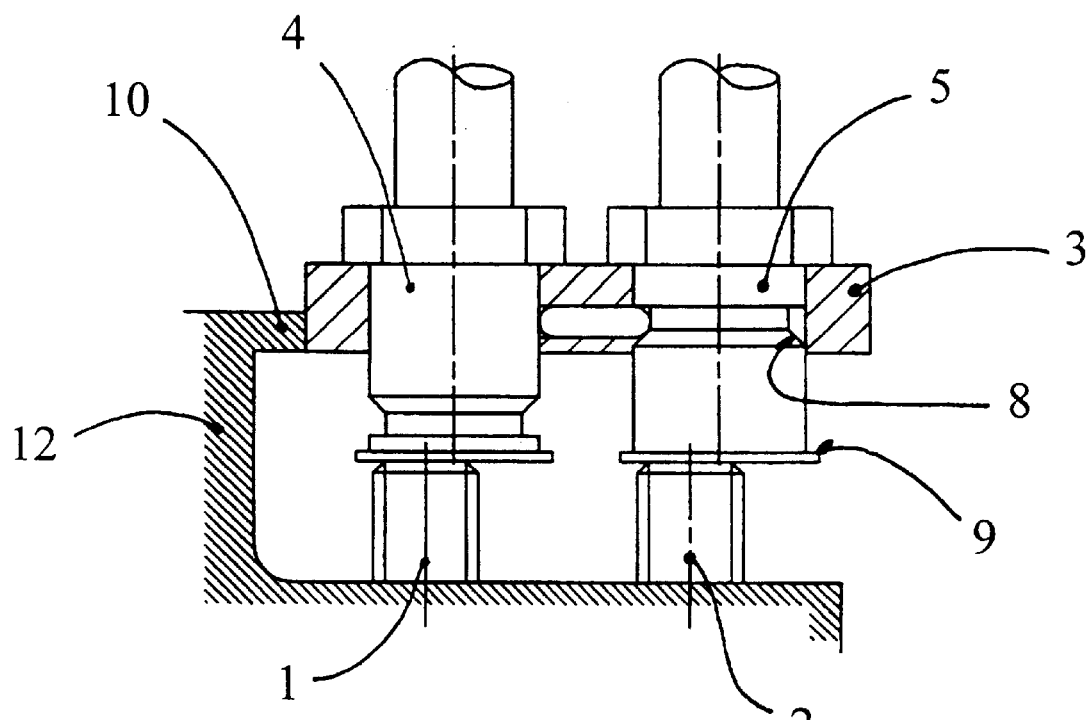
Fig : 5
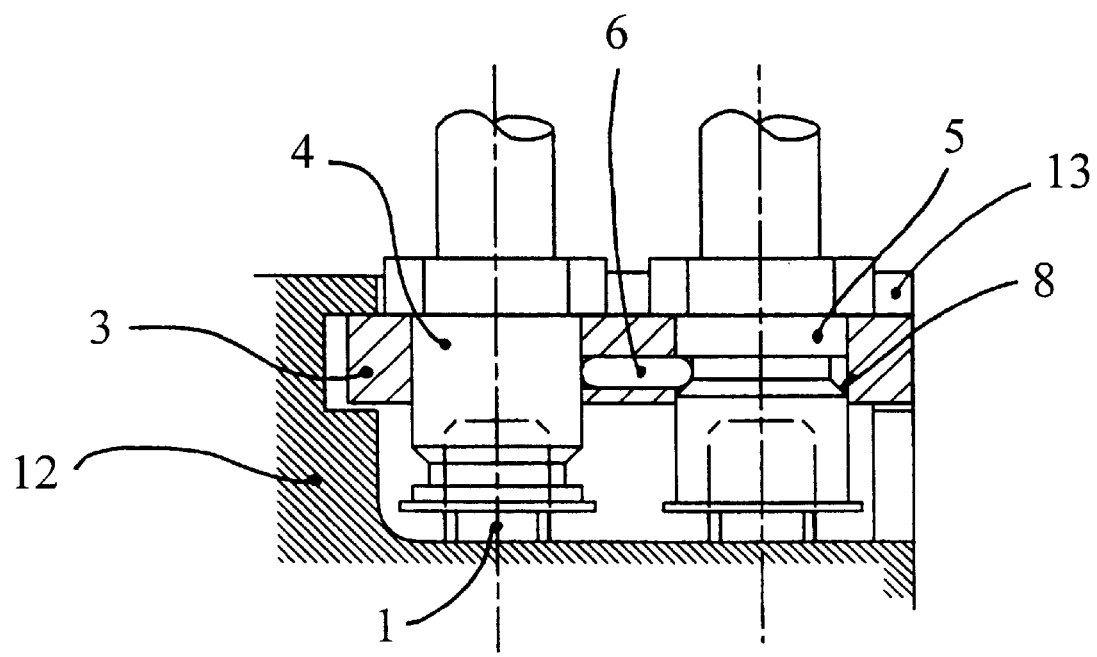
Fig : 6

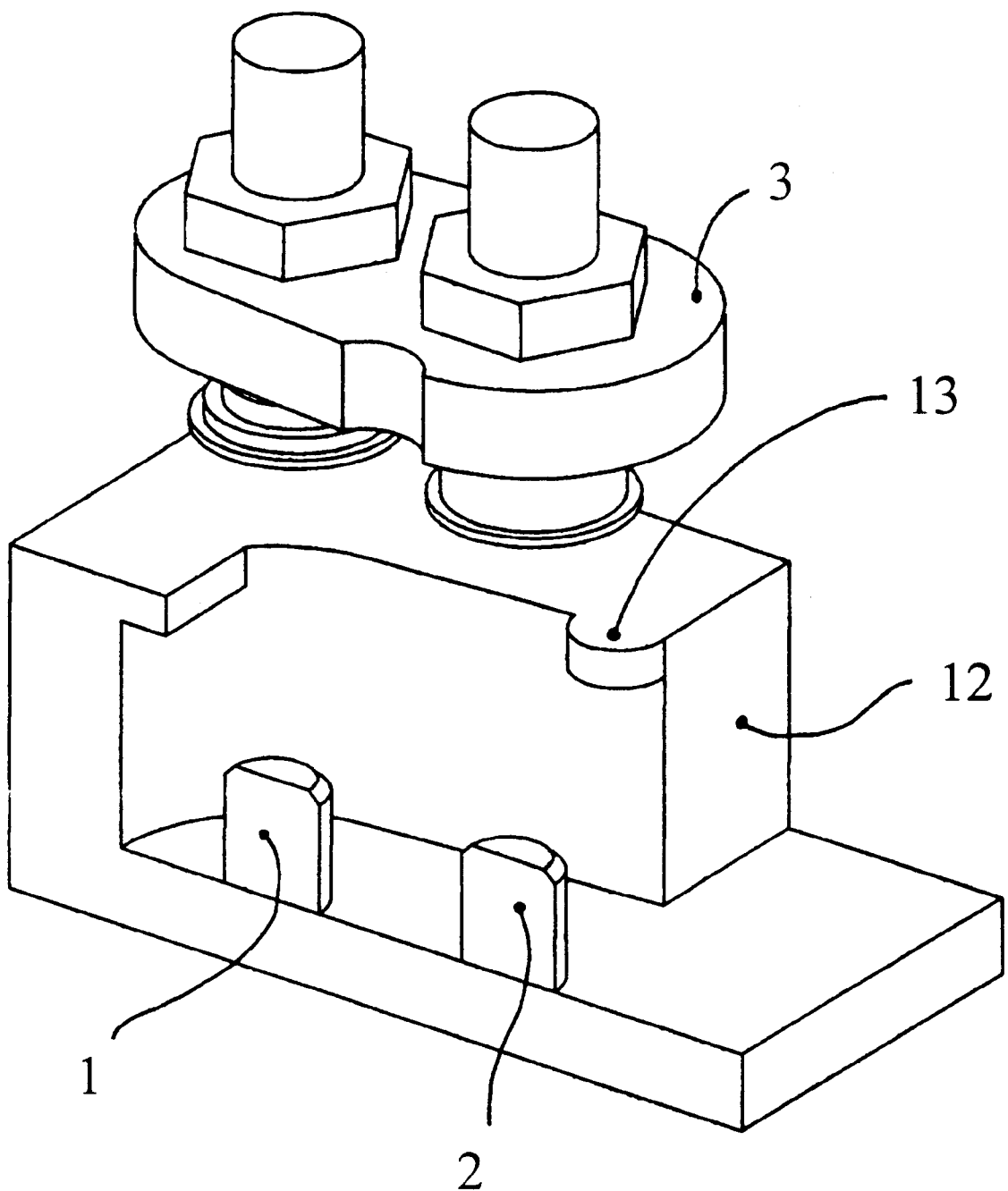
Fig : 7

HYDRAULIC FITTINGS FOR A HYDRAULIC UNIT WITH A SECURITY CONNECTION SYSTEM

BACKGROUND OF THE INVENTION

The present invention relates to a hydraulic unit and at least two hydraulic connections or fittings connectable with the hydraulic unit through a security connection system.

The invention is applicable to any hydraulic or fluid system and is particularly suited for use in the actuating hydraulic system for a thrust reverser of a bypass fan type turbojet engine where the thrust reverser must meet the highest standards of reliability.

It is well known in this type of application that the bypass fan engine is provided with a duct at the rear of the fan to channel the so-called cold, bypass flow. This duct consists of an inner wall which encloses the exterior of the engine core and of an outer wall which at its forward end is continuous with the fan housing. This outer wall may channel both the bypass flow and the so-called hot, primary flow exhausting from the rear of the jet engine (in which case the hot and cold flows may be either mixed or confluent), or may channel only the bypass flow when so-called separate flows are involved.

In addition, a wall may fair the engine exterior surface, that is, the outside surface of the housing which surrounds the fan, to the exterior surface of the outer wall of a bypass duct like that described above in order to minimize powerplant drag. This is the case especially for powerplants affixed to the exterior of an aircraft, in particular when these powerplants are attached under the wings or mounted to the rear of the fuselage.

The thrust reverser used with a fan type turbojet engines may be one several known types such as a door type reverser, a cascaded type reverser or the so-called "target" type reverser which is fitted with aft deflector panels. Generally, the moveable elements of these thrust reversers are driven by a hydraulic unit (also called a HCU or Hydraulic Control Unit) connected or associated with hydraulic linear actuators which directly effect the movement and locking of the elements of the thrust reverser. FIG. 1 of the attached drawings shows a known embodiment of such a hydraulic unit that includes a hydraulic circuit supply connector or fitting 14 and a hydraulic circuit return connector or fitting 15. In the known embodiments such as that shown in FIG. 1, the fluid supply hose or conduit and its associated connector 14 and the fluid return conduit and its associated connector 15 are physically separate from each other.

During maintenance, the supply and return conduits of the fluid circuit may be disconnected from the hydraulic unit at which time stoppers are used to protect the connectors. This presents the danger that the mechanic may reconnect the supply connector while forgetting to reconnect the return connector and leaving the stopper on the return connector. Should the engine be returned to service in this condition, the pressure in the hydraulic circuit may become excessive and cause operational difficulties.

It has been proposed in the prior art to design apparatus to prevent the hookup of a hydraulic supply conduit in the absence of the hookup of a return or discharge conduit such as, by way of example, the arrangement shown in connection with the filling means in the European patent document A 0,494,818 (U.S. Pat. No. 5,251,818).

BRIEF SUMMARY OF THE INVENTION

One objective of the present invention is to provide means which constitute a reliable and simple system providing a safety interlock system limiting the sequence of assembly and disassembly of hydraulic connectors at a hydraulic unit so that it is impossible to install first and second connectors (or any number of connectors) in an improper and unacceptable sequence.

The present invention provides at least two connector fittings for a hydraulic unit wherein the two fittings are connected to each other as a single assembly by a base plate that also serves as a housing in which is located a freely sliding pin located between the two fittings and cooperating with two grooves, one in each fitting. The grooves are mutually offset from each other along the fittings depending on the direction of assembly/disassembly motion along the axes of the fittings. The base plate preferably cooperates with a projection on the housing of the hydraulic unit to limit the assembly positions of the base plate relative to the housing during the steps of connection and disconnection.

Other features and advantages of the invention are set forth in the following descriptions of embodiments of the invention and in relation to the attached drawings.

BRIEF DESCRIPTION OF THE DRAWINGS

FIG. 1 is a perspective view showing a known arrangement of fluid connector fittings used with a conventional hydraulic unit.

FIG. 2 is a sectional side view of a portion of a hydraulic unit and two fluid fittings with a security connection system constructed according to one embodiment of the present invention, FIG. 3 shows the hydraulic unit and fittings of FIG. 2 with one fitting disconnected from the hydraulic unit, FIG. 4 shows the hydraulic unit and fittings of FIG. 2 with both fittings disconnected from the hydraulic unit, FIG. 5 shows a hydraulic unit and connector fittings in accordance with another embodiment of the invention, and which are generally similar to those of FIG. 2 but which are modified to prevent connection of the fittings to the hydraulic unit unless the fittings are connected in a prescribed sequence, FIG. 6 shows another embodiment generally similar to FIG. 2 but including strain relief characteristics due to the interfitting of elements, and FIG. 7 shows a perspective view of another embodiment of the invention showing the fluid fittings and a base plate having a polarizing constraint which couples the base plate and hydraulic unit.

DETAILED DESCRIPTION OF PREFERRED EMBODIMENTS OF THE INVENTION

In a first embodiment of the invention as shown in FIG. 2, a hydraulic unit 12 with adjacent hydraulic ports 1 and 2 is connected to fittings 4 and 5 through a base plate 3 provided with several apertures through which the fittings are inserted and which links these fittings together as a single assembly. The number of fittings is not limited to two as shown in FIG. 2 and the various other Figures but, for simplicity, only two fittings have been shown. It will be understood that two, three or any number of fittings might be used. In the illustrated two fitting arrangement, the base plate 3 links the fitting 4 to the fitting 5.

Fittings 4 and 5 are provided with locking grooves 7 and 8 respectively, in their peripheral surfaces, these grooves having profiles such that a camming action can axially drive a pin 6 contained within a close-fitting bore in the base plate 3 within which bore the pin 6 is free to axially slide. A similar locking or latching system could be obtained by a pivoting means or any other means known in the art, the purpose being to preclude movement of one element if another element is not in the proper position.

The pin 6 acts as a security catch or locking element relative to the base plate 3 for either of the fittings 4 and 5 depending on the positions of the fittings relative to the base plate 3. As shown in FIG. 2, the pin 6 prevents disassembling the fitting 5 as long as the fitting 4 has not lifted away from and has not fully cleared the hydraulic port 1 on hydraulic unit 12 and the groove 7 is not aligned with the pin 6. Notably, this system limits the sequence of disconnection and reconnection steps of the fittings to the hydraulic ports 1 and 2 as a function of the positions of the grooves 7 and 8 on the fittings 4 and 5 as determined by the positions of the fittings relative to the base plate 3.

The fittings 4 and 5 are retained in the base plate 3 either in a permanent manner, such as by radially upsetting the connection end 9 to a size which will not pass through the associated aperture in the base plate 3 or detachably such as by means of an elastic ring mounted at the end 9, or by any other means known in the art.

Once the fitting 4 has been axially moved within its aperture in the base plate 3 to the disconnected position as shown in FIG. 3, a retaining system may retain the fitting in this position relative to the base plate 3. Such a system may be a ball-and-spring detent system as shown in FIG. 3 or any other system known in the art. This system assures that the elements including fitting 4 and pin 6 will stay in the desired positions as shown in FIG. 3 during manipulation and disconnection of the fitting 5 from, for example, the hydraulic port 2.

The shape and size of the base plate 3 are matched to the intended environment of use. Thus, its size and shape will be compatible to the dimensions of the fittings 4 and 5, the dimensions and locations of the hydraulic ports 1 and 2, etc.

FIG. 3 shows an intermediate step during disconnection of the fittings 4 and 5 from hydraulic ports 1 and 2. This FIG. shows the clearance provided by the groove 7 of the fitting 4 for the pin 6.

FIG. 4 shows the fitting 5 disconnected such as by unscrewing fitting 5 from its hydraulic port 2, the bevel of the groove 8 having moved the pin 6 by camming action of the fitting 5 into the clearance space provided by the groove 7 of the fitting 4.

FIG. 5 shows a base plate position constraint for base plate 3 in the form of projecting portion 10 of hydraulic unit structure 12, which projecting portion 10 is located to one side of and generally over the portion on the hydraulic unit structure 12 which carries the hydraulic ports 1 and 2. During hookup, the end stops 9 on the fitting connection ends limit the distance that the fittings 4 and 5 may be moved upwardly through the base plate 3 until contact is made between the ends 9 and the base plate 3. Once the fittings 4 and 5 have been raised clear of the hydraulic ports, the elements are in the positions shown in FIG. 4. With this positioning of the elements during reconnection, the fitting 5 may be screwed onto the hydraulic port 2 until such time as the groove 8 is advanced into alignment with the bore containing pin 6 whereupon the pin 6 may be moved into groove 8 thus allowing fitting 4 to now be screwed onto hydraulic port 1.

In the embodiment shown in FIG. 6 and FIG. 7, an optional projecting tab 13 or removal constraint on the structure 12 helps capture or constrain removal motion of the base plate 3 so that a pullout force applied to the fitting 5 will be taken by tab 13 should fitting 5 erroneously be disconnected from the hydraulic port 2 before fitting 4 is disconnected from connector port 1. If tab 13 is absent, the pullout force would otherwise be transmitted from the fitting 5 through the pin 6, the base plate 3, groove 8, etc. The play needed to allow connection and disconnection may be provided either between the base plate 3 and the structure 12 or between the fittings and the upper part of the base plate 3.

A mechanical polarization or assembly constraint device which prevents improper connection of the fittings may be obtained either in the manner of the embodiment of FIG. 7 in which a specific and matched shape of base plate 3 can be interfitted and received in the unit 12 in a single position or obtained by the use of different diameter hydraulic ports 1 and 2 which match the diameters of the fittings 4 and 5. The hydraulic ports 1 and 2 may project the same distance above their bases by which bases the ports are mounted to the unit 12.

The embodiments previously described in relation to FIGS. 2 through 6 require screwing the fittings 4 and 5 on the hydraulic ports 1 and 2. It will be appreciated that the invention may employ a so-called "quarter-turn" or quick disconnect hookup system or any other known quick-disconnect means. In our invention, an intermediate lock of appropriate design and integrated into the base plate linking the fittings also allows rapid mounting one fitting prior to the other.

Installation clearance difficulties, limitations of available materials or other reasons may make it desirable that the structure shown at 12 be separate from the basic hydraulic unit, in which case the locations of the installed structure 12 and basic hydraulic unit may be anywhere which meets design requirements of the engine and thrust reverser.

The pin 6 constituting a security catch axially slides in a close-fitting bore in base plate 3, as described above, for motion between the peripheries of the fittings 4 and 5 and the locking grooves 7 and 8 of the fittings. The pin extends between adjacent sections of the fitting peripheries and has a length that is greater than the distance between said adjacent fitting periphery sections that are not grooved so that the catch must be located so that it extends into at least one groove of one fitting before the other fitting can be axially moved for connecting and disconnecting the fitting relative to the base plate 3. Of course, when pin 6 engages a groove 7, 8, the respective fitting is constrained against motion relative to base plate 3.

Also, it will be noted, as shown in FIG. 6, when the fittings 4 and 5 are fully extended and connected with the ports 1 and 2, the pin 6 extends into one of the grooves 8 and contacts the periphery of the other fitting 4. Accordingly, unless the pin 6 extends into at least one groove, the other fitting cannot be axially moved for connecting or disconnecting the fitting relative to the ports 1 and 2. The axial displacement of the grooves relative to the ends of the fittings 4 and 5 prescribes a sequence of connecting and disconnecting movements of the fittings 4 and 5.

Various modifications to the structure of the preferred embodiments to achieve the same function can be made by the person skilled in the art without departing from the scope of the invention defined by the following claims.

We claim:

1. A security hydraulic coupling comprising:
   a base plate;
   at least two axially connectable connector fittings, each fitting including a peripheral locking groove and a connection end, said grooves each being axially spaced along said fittings a different distance from said connection end of each respective fitting;

said fittings supported by said base plate for axial connection and disconnection motion relative to the base plate and linked together as a single assembly with said base plate with the fittings located a fixed distance apart;

a security catch slidably carried by the base plate for motion between the fitting peripheries and the locking grooves, said catch extending between adjacent sections of the fitting peripheries and having a length that is greater than the distance between said adjacent fitting periphery sections that are not grooved, thereby requiring that the catch be located so that it extends into at least one groove of one fitting before the other fitting can be axially moved relative to the base plate for connecting and disconnecting the fitting.

2. The coupling according to claim 1, wherein the security catch, fittings and base plate are assembled together so that, when both fittings are fully axially extended into hydraulic connecting positions relative to the base plate, the catch extends into the groove of one fitting and engages the periphery of the other fitting spaced away from the groove of said other fitting; and a friction detent constituting part of the single assembly arranged to engage the peripheral groove of the other fitting when the other fitting is fully moved away from the connection position.

3. The coupling according to claim 1, wherein said security catch comprises an axially slidable pin member disposed in a close-fitting bore in said base member.

4. The coupling according to claim 1, wherein said fittings are permanently assembled to the base plate.

5. A security hydraulic coupling and a hydraulic unit cooperating with said coupling, said coupling comprising:

a base plate;

at least two axially connectable connector fittings, each fitting including a peripheral locking groove and a connection end, said grooves each being axially spaced along said fittings a different distance from said connection end of each respective fitting;

said fittings supported by said base plate for axial connection and disconnection motion relative to the base plate and linked together as a single assembly with said base plate with the fittings located a fixed distance apart;

a security catch slidably carried by the base plate for motion between the fitting peripheries and the locking grooves, said catch extending between adjacent sections of the fitting peripheries and having a length that is great than the distance between said adjacent fitting periphery sections that are not grooved, thereby requiring that the catch be located so that it extends into at least one groove of one fitting before the other fitting can be axially moved relative to the base plate for connecting and disconnecting the fitting;

said hydraulic unit including adjacent hydraulic ports oriented so as to be axially connectable with said fittings when the base plate is assembled with the hydraulic unit with the fittings in axial alignment with the ports;

a base plate position constraint cooperating between the hydraulic unit and the base plate structurally requiring the base plate and the fittings to be placed in a specific position relative to the ports before the fittings can be aligned with and connected to the ports.

6. The security hydraulic coupling according to claim 5, said hydraulic unit including a structural base plate removal constraint preventing motion of the base plate away from the ports of the hydraulic unit after connection of the fittings to the ports so long as the fittings are connected to the ports.

7. The security hydraulic coupling according to claim 6, said hydraulic unit and base plate including a structural polarizing device that requires a predetermined orientation of the base plate and fittings relative to the hydraulic unit before assembly of the base plate with the hydraulic unit at a location where the fittings are in alignment with the ports.

* * * * *